US012082567B2

(12) United States Patent
Stalnecker

(10) Patent No.: US 12,082,567 B2
(45) Date of Patent: Sep. 10, 2024

(54) DISSOLVABLE FISHHOOK AND FISHING LINE

(71) Applicant: Frederick Davis Stalnecker, Branson, MO (US)

(72) Inventor: Frederick Davis Stalnecker, Branson, MO (US)

(*) Notice: Subject to any disclaimer, the term of this patent is extended or adjusted under 35 U.S.C. 154(b) by 66 days.

(21) Appl. No.: 18/094,714

(22) Filed: Jan. 9, 2023

(65) Prior Publication Data

US 2023/0217908 A1 Jul. 13, 2023

Related U.S. Application Data

(60) Provisional application No. 63/266,525, filed on Jan. 7, 2022.

(51) Int. Cl.
*A01K 83/00* (2006.01)
(52) U.S. Cl.
CPC .................... *A01K 83/00* (2013.01)
(58) Field of Classification Search
CPC ...................................... A01K 83/00
See application file for complete search history.

(56) References Cited

U.S. PATENT DOCUMENTS

| 4,715,142 | A | * | 12/1987 | Richard | A01K 83/00 43/43.16 |
| 5,890,316 | A | * | 4/1999 | Rodgers | A01K 83/00 43/43.16 |
| 6,141,900 | A | * | 11/2000 | Rudolph | A01K 85/00 43/42.31 |
| 9,572,329 | B2 | * | 2/2017 | Hopkins | A01K 83/00 |
| 2012/0124886 | A1 | * | 5/2012 | Hopkins | A01K 83/00 43/4.5 |
| 2013/0239459 | A1 | * | 9/2013 | Rosenberg | A01K 83/06 43/44.2 |
| 2022/0087237 | A1 | * | 3/2022 | Wilson | A01K 83/00 |

FOREIGN PATENT DOCUMENTS

| CA | 2198680 A1 | * | 2/1997 | |
| DE | 102006005747 A1 | * | 8/2007 | A01K 83/00 |
| GB | 2447452 A | * | 9/2008 | A01K 83/00 |

* cited by examiner

*Primary Examiner* — Richard G Davis
(74) *Attorney, Agent, or Firm* — Billion & Armitage

(57) ABSTRACT

A fishhook including a shank, an eye attached to the shank, a bend attached to the shank and terminating in a point. The fishhook further including a core of a dissolvable material, and at least one coating or layer on the core. The at least one coating is dissolvable in water, saltwater, or the stomach acid of an animal. A fishing line includes a line composed of a dissolvable material, and a coating coated on said line composed of a dissolvable material.

18 Claims, 5 Drawing Sheets

DISSOLVABLE FISHHOOK AND FISHING LINE

RELATED APPLICATION

This application claims priority to U.S. Provisional Application No. 63/266,525, filed on Jan. 7, 2022, which is incorporated by reference in its entirety.

BACKGROUND OF THE INVENTION

The present invention relates to fishing materials and, more particularly, to a dissolvable fishhook and fishing line.

Fishing with a line requires the use of a hook. Hooks are routinely left in the bodies of aquatic animals for many reasons, and all of them may be lethal to the animal.

Fisherman typically do not want to leave a hook in a fish's mouth. When releasing a fish, it is common to take measures to ensure the fish remains alive and returns to the ecosystem. However, sometimes the hook cannot also be easily or safely removed. That decision is typically made in the moment.

If a fishing line breaks, the hook will be left in the fish. A fisherman may be battling a fish on his/her line when suddenly the line snaps. This may occur if the teeth of the fish break the line or if the line gets caught on an underwater structure, such as rocks or a reef.

Sometimes, a fish swallows a hook. Retrieving or removing the hook from its belly could cause more harm. It is common to leave the hook in the fish's belly.

There are also some dangerous or large fish. It is best to avoid contact with these fish. If you hook one of these creatures, it is normally safest to release it by cutting the line. In some situations, the fish will be better served staying in the water rather than being exposed to the air for a long period of time while the hook is removed. In this instance, leaving the hook in the fish could be beneficial to both parties, both the angler and the fish.

It is estimated that between 0.97 to 2.7 trillion fish are caught from the wild globally each year. This doesn't include the billions of fish that are farmed. Fish account for approximately 40% of animal products consumed. There are no statistics on the amount of fish that suffer or die from hooks left in them. Given that trillions of fish are caught every year, it is safe to assume the amount of fish that suffer or die from hooks left in them is no small matter.

Currently, there are no dissolving fish hooks available. Presently manufactured fishhooks are said to be non-dissolving and may take 2 months to 2 years to decompose in water. Many hooks take centuries to degrade. Stainless hooks take as long as 300 years. Greek fishing hooks have been found in the ocean from 1000 years ago. A fishhook stuck in an animal's stomach during that time can cause irreparable harm and even death. The time until decay/decomposition varies depending on the material, its environment, its age, and the amount of wear and tear on the hook.

In addition to the damage fishhooks cause to fish, fishing lines damage the environment. An untold number of animals are injured or killed each year from fishing lines. Between 2002 and 2015, almost 3,000 birds were treated by California wildlife clinics for injuries caused by fishing gear, including fishing lines. Sea animals, such as fish, turtles, and crabs are also frequently injured by lines.

Present fishing lines take approximately 600 years to decompose. They are invisible, strong, and last for lifetimes damaging animals in their path.

As can be seen, there is a need for a dissolvable fishhook and fishing line which does not harm aquatic animals.

SUMMARY OF THE INVENTION

A fish catching apparatus including a fishhook composed of a dissolvable material, and a coating coated on said fishhook composed of a dissolvable material. A fishing line including a line composed of a dissolvable material, and a coating coated on said line composed of a dissolvable material.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

A general overview of the various features of the invention will be provided, with a detailed description following. Broadly, an embodiment of the present invention provides a fishhook and a fishing line composed of a dissolvable material.

An integrity of the fishhook may be substantially unchanged for several hours after being placed in or submerged in an aqueous solution such as water. In some embodiments of the present invention, the fishhook remains at substantially full integrity for approximately 6 hours. In another embodiment, the fishhook remains at substantially full integrity for 0-12 hours. In still another embodiment, the fishhook remains at substantially full integrity for 0-18 hours. The fishhook may completely dissolve within 24 hours, preventing serious damage or life-threatening injuries to a fish who may have swallowed the fishhook. In other embodiments, the fishhook may dissolve in 36 hours or 48 hours.

The fishhook may be barbed or barbless. Any size hook may be used. Additionally, any configuration of hook may be used such as treble, double, snelled, and fly hooks. The fishhook and its coating may be any color. The fishhook may attach to a fishing line by any appropriate means.

Figure 3:
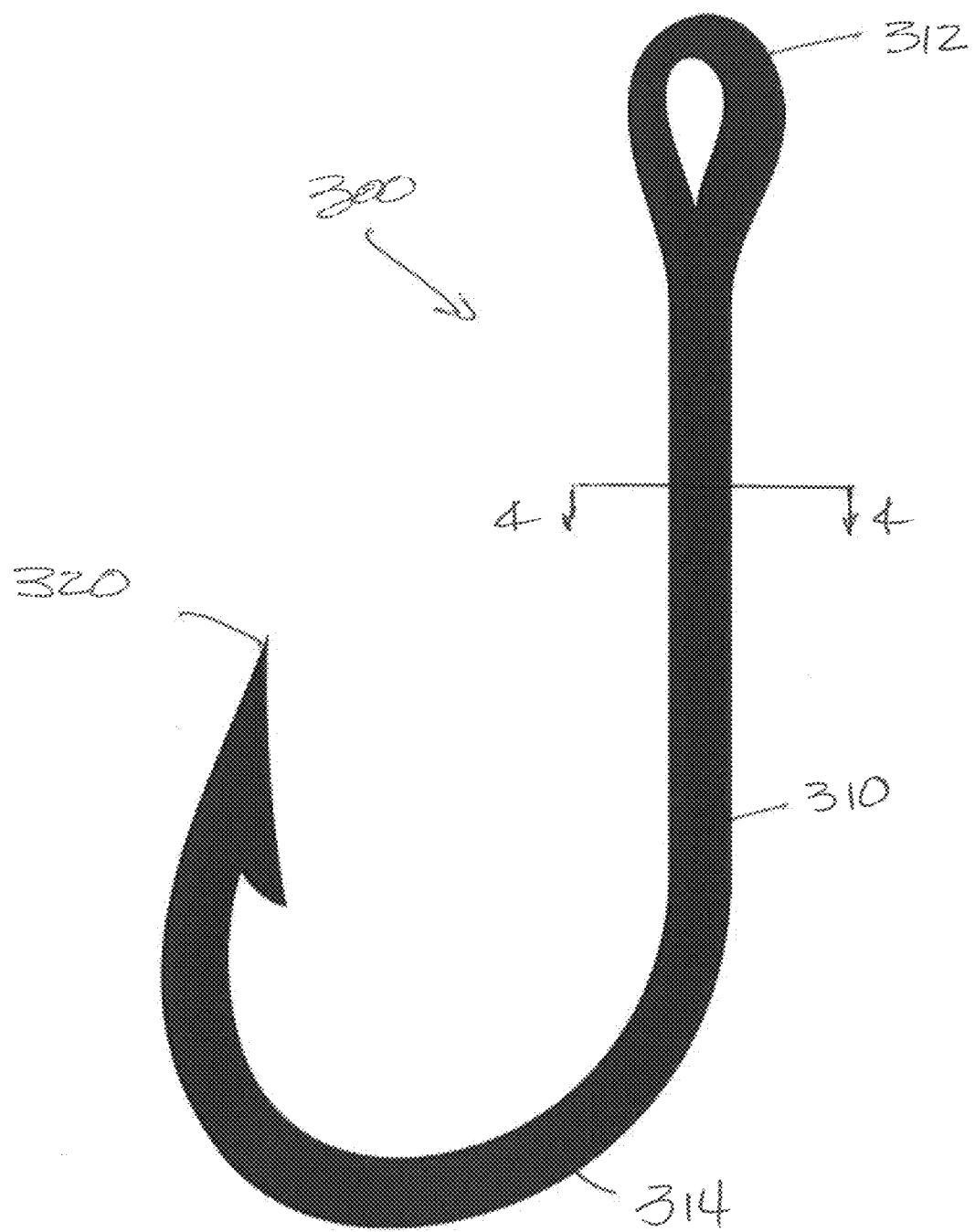
FIG. 3 is a side view of a fishhook according to one embodiment.

FIG. 3 is a side view of a fishhook 300 according to one embodiment. The fishhook shown is a single hook and is selected on the basis of being representative of all fishing hooks and also for its simplicity. The fishhook 300 includes a shank 310. Attached to one end of the shank 310 is an eye 312. Attached to the other end of the shank 310 is a bend 314. The free end of the bend 314 is a point 320.

Figure 4:
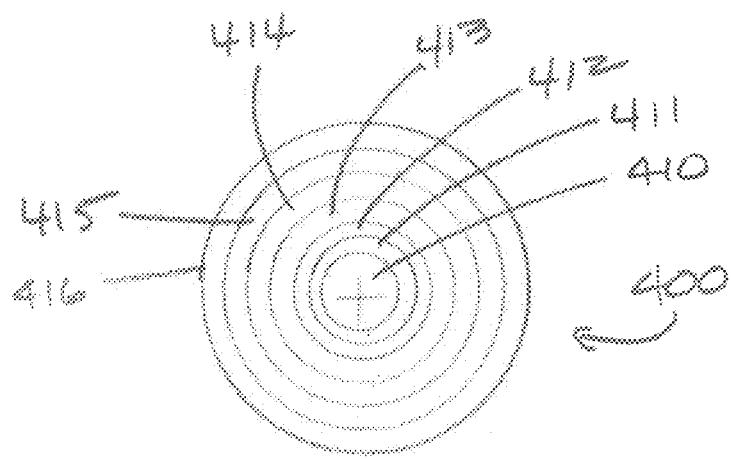
FIG. 4 is a cross sectional view of a fishhook along line 4-4 shown in FIG. 3, according to one embodiment.

FIG. 4 is a cross sectional view of the shank 310 of a fishhook 300 along line 4-4 shown in FIG. 3, according to one embodiment. It should be pointed out that this cross section will be the same for the eye 312 and the bend 314 of the fishhook 300. As shown in FIG. 4, the fishhook includes a core 410 of material that is shaped to provide the basic shape of the fishhook 300. The core material 410 is made of a dissolvable material. In some embodiments, this core material is a metal which dissolves or breaks down very quickly in fresh water, salt water or in the presence of acid, such as stomach acid of a fish. The core 410 could also be a biodegradable plastic and could be molded. In another embodiment, the disposable material could be a ceramic that is dissolvable. The ceramic could also be molded or otherwise formed. At least one layer 411 is placed over the core or core material 410. The at least one layer 411 is also a dissolvable material or a biodegradable material. An additional layer or layers can also be applied to the at least one layer 411. These additional layers, such as layers 412, 413, 414, 415 and 416 shown in FIG. 4 would also be dissolvable in water or salt water or in bodily fluids, such as stomach acid. It should be noted that even though six layers 411, 412, 413, 414, 415 and 416 are shown in FIG. 4, in other embodiments more or less layers can be added to the core. The layers 411, 412, 413, 414, 415 and 416 can all be different from one another. In other embodiments, some of the layers 411, 412, 413, 414, 415 and 416 shown in FIG. 4 can be made of a common material. For example, a ceramic core 410 can include several layers of ceramic, such as layers 412, 414 and 416. Layers may also be selected based on the application. For example, a fishhook 300 for use in saltwater may have layers with more durability or resistivity to salt as salt is generally considered more corrosive than fresh water. It would also seem that layers could be selected that would break down very quickly in the presence of body fluid yet break down or dissolve more slowly in fresh water. In this embodiment, if the fishhook was in a fish' stomach, the fishhook 300 would break down more rapidly than in salt water or fresh water.

The fishhook 300 may have a coating or layer, such as coatings or layers 411, 412, 413, 414, 415 and 416. The coating may be dissolvable. A thickness of the coating 411, 412, 413, 414, 415 and 416 on the fishhook 300 may be increased or decreased. The thickness of the coating may be proportionally related to a time for the coating to completely dissolve. The thickness of the coating may affect the time the fishhook may remain in water until the fishhook begins dissolving.

Figure 5:
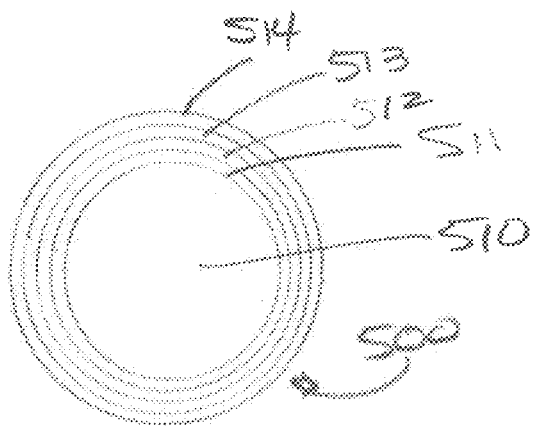
FIG. 5 is a cross sectional view of a fishhook along line 4-4 shown in FIG. 3, according to another embodiment.

FIG. 5 is a cross sectional view of the shank 310 of a fishhook along line 4-4 shown in FIG. 3, according to another embodiment. As shown in FIG. 5, the fishhook 300 may be quite different than the cross section 400 shown in FIG. 4. The core 510 is greater in diameter than the core 410 of FIG. 4. The layers or coatings 511, 512, 513 and 514 are fewer and are thinner than the layers shown in FIG. 4. The layers all are about the same thickness. It should be noted that the layers or coatings can be uniform or about the same, as shown in FIG. 5. The layers may also vary in thickness in still other embodiments.

Figure 6:
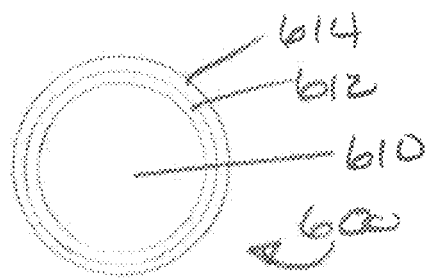
FIG. 6 is a cross sectional view of a fishhook along line 4-4 shown in FIG. 3, according to another embodiment.

FIG. 6 is a cross sectional view of a fishhook 300 along line 4-4 shown in FIG. 3, according to another embodiment. In this embodiment, there are still fewer layers or coatings 612 and 614 on a core 610 of a medium size as compared to the cross sections 400, 500 shown in FIGS. 4 and 5, respectively.

Now looking at FIGS. 3-6, the fishhook 300 and its coating or coatings and layers may be composed of a variety of materials including but not limited to: metalizing thermal spray, twin wire arc, flame spray, laser cladding, HVOF (high velocity oxygen fuel), weld overlay, epoxy, ceramic, electroplating, hot dip galvanization, chemical vapor deposition, and ceramic salts. The fishhook and coating may be composed of the same or different materials. The composition of the fishhooks and the coating is not particularly limited by the present invention. The fishhook 300 and coating or layers thereon may be any material that dissolves or corrodes after a specified, interval or measurable period of time. They may be made of dissolvable plastic as well. Dissolvable plastics are made from a combination of chemicals and materials, just like its non-dissolvable counterpart. However, dissolvable plastics are derived from different raw materials which enable them to break down, similar to biodegradable plastics made from ingredients such as corn oil, starch, fruit peel, and plants. Polyvinyl Alcohol (PVA) may similarly be used. PVA breaks down over time and comes from natural gas or calcium carbide. PVA-based plastic may be dissolved in water, safely removing risks to animal and plant life and reducing sea and ocean pollution around the world.

Sodium, potassium, and ammonium salts are soluble in water. Chlorides, bromides, and iodides of all metals except lead, silver, mercury(I), platinum, and gold are soluble in water. Such dissolvable metals may be used to make the fishhook or coating. Sodium and calcium being some of the most reactive metals in cold water may also be used. Less reactive metals in cold water such as magnesium may be used as well.

In some embodiments of the present invention, the composition of the fishhook 300 and coating or coatings and layers may not harm or poison the fish or environment.

Figure 7:
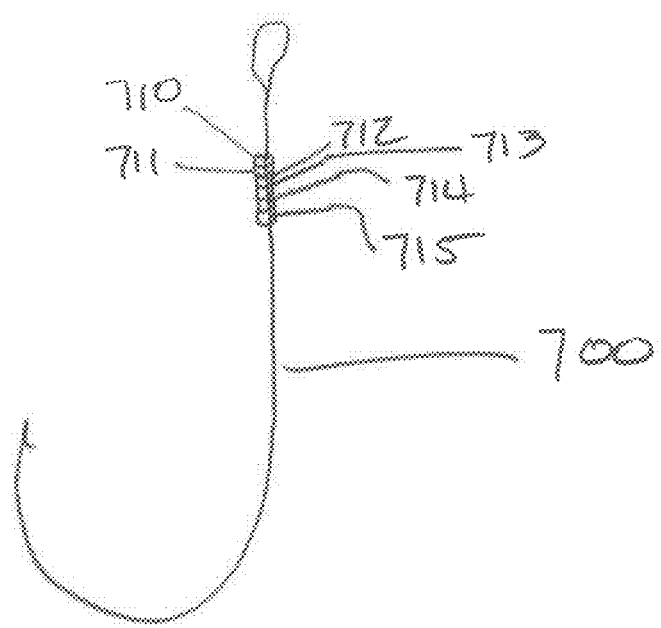
FIG. 7 is a side view of a fishhook having a number of rings thereon for communicating or indicating an amount of dissolvable coating remaining, and communicating an estimated time until a loss of integrity and usefulness of the fishhook, according to an embodiment.

In one embodiment, such as the fishhook 700 shown in FIG. 7, the inventive apparatus may communicate to a user an amount of dissolvable coating remaining, thereby communicating an estimated time until a loss of integrity and usefulness of the apparatus 700. For example, the fishhook 700 may have rings 710, 711, 712, 713, 714, 715 on its shank which appear or disappear as the hook or coating dissolves. In some embodiments of the present invention, a hook 300 at full strength may have six coatings on top of each other, such as shown in FIGS. 3 and 4. Each coating has a separate ring. As an example, each coating may take approximately 1 hour to dissolve in water. As one coating dissolves, its ring disappears. By observing the number of rings on the hook, the user may know how many coatings remain on the hook, thereby estimating the approximate hours of use until the hook begins dissolving. In another embodiment of the present invention, the hook may change color as the hook or its coatings dissolve, communicating to the many coatings remain.

In some embodiments of the present invention, the hook is composed of several layers. Each layer may be a different color be marked marking such as a ring. The user may be made aware of the integrity, and time of use, remaining in the hook by observing how many layers remain on the hook.

An app may be included on a phone which shows how many hours of use remain in a hook. The app could relate the color of the layer to the number of hours or the time remaining.

Figure 8:
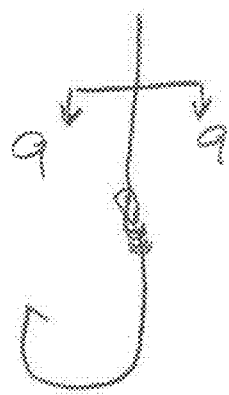
FIG. 8 is a side view of a fishing line attached to a fishhook, according to one embodiment.

FIG. 8 is a side view of a fishing line 800 attached to a fishhook 801, according to one embodiment. A fishing line 800 may be composed of a same or a substantially similar material as the fishhook of FIGS. 3-7 and function in a similar manner.

Figure 9:
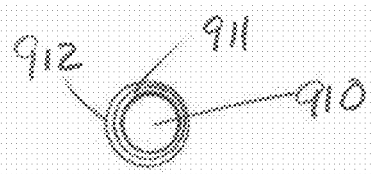
FIG. 9 is a cross sectional view of a fishhook along line 8-8 shown in FIG. 6, according to one embodiment.

FIG. 9 is a cross sectional view of a fishing line or line along line 9-9 shown in FIG. 8, according to one embodiment. The fishing line 800 includes a core 910 and a plurality of layers or coatings, 911 and 912. Two layers or coatings 911 and 912 are shown in FIG. 9. It should be understood that some embodiments can include more or less coatings or layers. The core can be made of a biodegradable plastic or other line which stretches or operates in an elastic region if it is desirable to replicate a monofilament type of fishing line. In other embodiments, the amount of stretch or give can be limited in a line that is to replicate a braided fishing line with little to no give so that even the slightest strike or nibble is more easily detected to the skilled angler. The fishing line may change colors over time as its coating or coatings dissolve, communicating its strength to a user.

Figure 10:
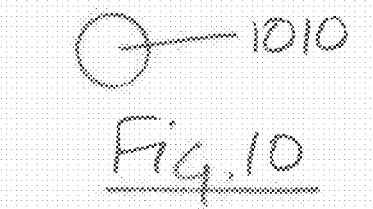
FIG. 10 is a cross sectional view of a fishhook along line 8-8 shown in FIG. 6, according to another embodiment.

FIG. 10 is a cross sectional view of a fishing line 1000 along line 9-9 shown in FIG. 8, according to another embodiment. Basically, the fishing line shown in FIG. 10 has no coatings or layers atop a core 1010. This fishing line may be made of a biodegradable plastic. In this case, the fishing line will last at least a season or a number of months. The fishing line is formulated to degrade much faster than current fishing lines which are said may degrade in 600 years. In this sense, at least the environment will be helped in that the fishing line will not last for generations. The fishing line 800 should be formulated so that it lasts longer than a few outings. It should last at least one or more months. In one embodiment, it could last about 12 months so that the fisherman has to respool each fishing season or so.

The coating may also provide a taste, smell, and slipperiness to the hook. Alternatively, the coating may be neutral of taste and odor.

Figures 1, 2:
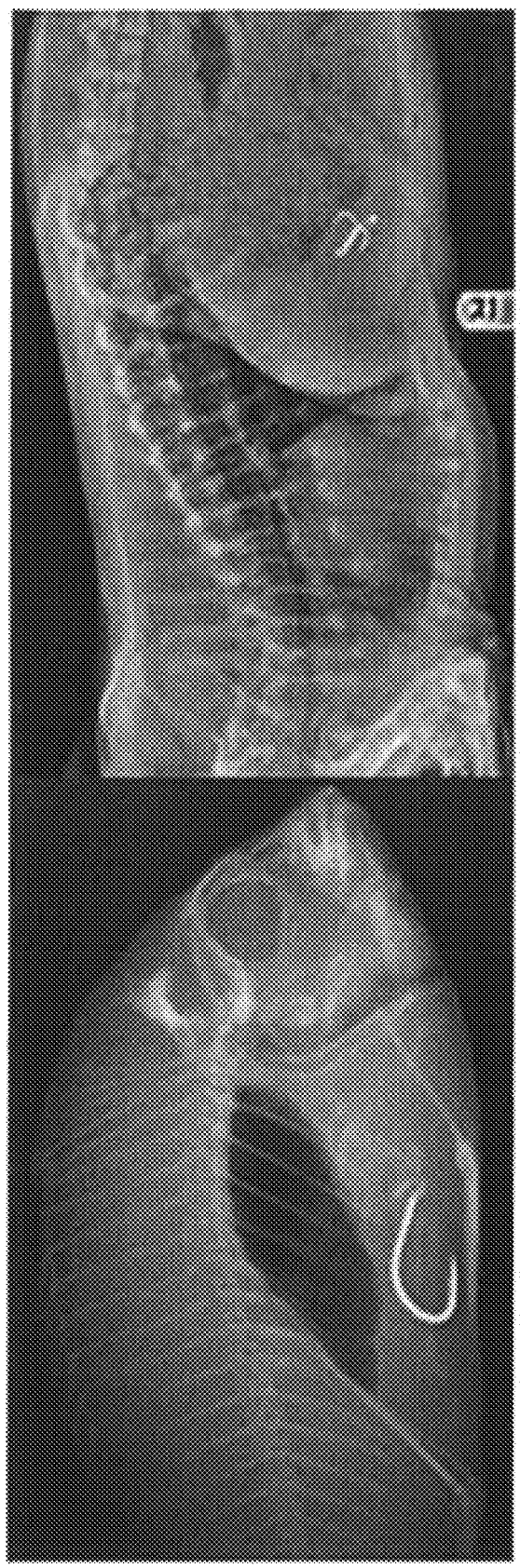
FIG. 1 is a depiction of an X-Ray showing a fishhook in an animal.
FIG. 2 is a depiction of an X-Ray showing a fishhook in an animal.

FIGS. 1 and 2 are X-Rays of fishhooks stuck in animals. These figures are examples of fishhooks and fishing lines that take years to dissolve, damaging the environment until they do so.

In summary, a fishhook including a shank, an eye attached to the shank, a bend attached to the shank and terminating in a point. The fishhook further including a core of a dissolvable material, and at least one coating or layer on the core. In one embodiment, the at least one coating is dissolvable in water, saltwater, or the stomach acid of an animal. In one embodiment, the at least one coating will dissolve fasting in the stomach acid than in water or saltwater. The at least one coating is a first color and the core is of a second color different from the first color. In a further embodiment, the fishhook includes a second coating dissolvable in water. The second coating, in another embodiment, is a third color different than the second color or first color. In one embodiment the first, second and third coatings are red, yellow and green. In still another embodiment, the fishhook of further includes a first indicator associated with the core. The first indicator is on a portion of the fishhook. In yet another embodiment, a second indicator associated with the at least one coating. The second indicator is also on a portion of the fishhook. The first indicator is a first color, and the second indicator is a second color. In some embodiments, the first indicator is a first ring about the periphery of the shank and the second indicator is a ring about the periphery of the shank. In another embodiment, the fishhook has a second coating and in yet another embodiment, the second coating has a third indicator associated therewith. The first indicator is a first color, the second indicator is a second color, and the third indicator is a third color. The first indicator, second indicator, and third indicator dissolve and disappear over time. The third indicator dissolves first and reveals the second indicator, then the second indicator dissolves and reveals the first indicator. The first indicator indicates that the fishhook should be taken out of service. In still further embodiments, the fishhook includes multiple layers or coatings coated on said fishhook and said coatings dissolve at measurable intervals, communicating to a user a number of coatings remaining. The fishhook can include a plurality of different coatings having different colors and different mechanical properties including different rates at which the coatings dissolve or otherwise degrade.

A fishing line includes a line composed of a dissolvable material, and a coating coated on said line composed of a dissolvable material. In still other embodiments, the fishing line includes multiple coatings coated on said line wherein said coatings dissolve at measurable intervals, communicating to a user a number of coatings remaining.

It should be understood, of course, that the foregoing relates to exemplary embodiments of the invention and that modifications may be made without departing from the spirit and scope of the invention as set forth in the following claims.

What is claimed is:
1. A fishhook comprising:
   a shank;
   an eye attached to the shank;
   a bend attached to the shank and terminating in a point, the fishhook further comprising:
      a core of a dissolvable material; and
      at least a first coating and a second coating on the core.
2. The fishhook of claim 1 wherein the first coating is dissolvable in water.
3. The fishhook of claim 1 wherein the first coating is dissolvable in saltwater.
4. The fishhook of claim 1 wherein the first coating is dissolvable in water and dissolves faster in stomach acid of an animal.
5. The fishhook of claim 1 wherein the first coating is a first color and the core is of a second color different from the first.
6. The fishhook of claim 1 wherein the second coating is dissolvable in water.
7. The fishhook of claim 6 wherein the second coating is a third color different than the second color or first color.
8. The fishhook of claim 7 wherein the first, second and third colors are red, yellow and green.
9. The fishhook of claim 1 further comprising a first indicator associated with the core, the indicator on a portion of the fishhook.
10. The fishhook of claim 9 further comprising a second indicator associated with the first coating, the indicator on a portion of the fishhook.
11. The fishhook of claim 10 wherein the first indicator is a first color and the second indicator is a second color.
12. The fishhook of claim 10 wherein the first indicator is a first ring about the periphery of the shank and the second indicator is a ring about the periphery of the shank.

13. The fishhook of claim 10 further comprising a third indicator associated with the second coating.

14. The fishhook of claim 13 wherein the first indicator is a first color, the second indicator is a second color, and the third indicator is a third color.

15. The fishhook of claim 13 further wherein the first indicator, second indicator, and third indicator dissolve and disappear at over time, the third indicator dissolving first and revealing the second indicator, the second indicator dissolving and revealing the first indicator.

16. The fishhook of claim 13 further wherein the first indicator indicates that the fishhook should be taken out of service.

17. The fishhook of claim 1, wherein the at least first and second coatings coated on said fishhook dissolve at measurable intervals, communicating to a user a number of coatings remaining.

18. The fishhook of claim 1 further comprising a plurality of additional different coatings.

* * * * *